US012489797B2

(12) United States Patent
Giralte et al.

(10) Patent No.: US 12,489,797 B2
(45) Date of Patent: Dec. 2, 2025

(54) SYSTEMS, METHODS, AND DEVICES FOR IMPROVED SECURITY POLICY DISTRIBUTION IN A CLOUD-COMPUTING ENVIRONMENT

(71) Applicant: Salesforce, Inc., San Francisco, CA (US)

(72) Inventors: Luis Campo Giralte, Dublin (IE); Anil Abraham, Bangalore (IN)

(73) Assignee: Salesforce, Inc., San Francisco, CA (US)

( * ) Notice: Subject to any disclaimer, the term of this patent is extended or adjusted under 35 U.S.C. 154(b) by 348 days.

(21) Appl. No.: 18/161,632

(22) Filed: Jan. 30, 2023

(65) Prior Publication Data
US 2024/0259435 A1 Aug. 1, 2024

(51) Int. Cl.
*H04L 9/40* (2022.01)

(52) U.S. Cl.
CPC ........ *H04L 63/205* (2013.01); *H04L 63/0263* (2013.01)

(58) Field of Classification Search
CPC .... H04L 63/205; H04L 63/0263; H04L 63/20
See application file for complete search history.

(56) References Cited

U.S. PATENT DOCUMENTS

| 7,516,475 B1* | 4/2009 | Chen ...................... H04L 63/20 726/1 |
| 2004/0064727 A1* | 4/2004 | Yadav ..................... H04L 63/20 726/1 |
| 2022/0060445 A1* | 2/2022 | Kovenat ............... H04L 61/256 |
| 2022/0103559 A1 | 3/2022 | Weisshaar et al. |

* cited by examiner

*Primary Examiner* — Amie C. Lin
(74) *Attorney, Agent, or Firm* — Polygon IP, LLP

(57) ABSTRACT

Systems, methods, and devices are disclosed herein that provide distribution of policies for computing platforms. A computing platform may be implemented using a server system, and the computing platform is configurable to cause receiving a policy data object at a first domain of the computing platform, the policy object identifying one or more security policies associated with the first domain, and determining if the policy data object should be implemented at the first domain based, at least in part, on a second domain identified by the policy data object. The computing platform is also configurable to cause determining if one or more changes should be made to the policy data object based, at least in part, on one or more properties of the first domain, and implementing the policy data object at the first domain by translating the policy data object from a generic syntax to a domain-specific syntax.

20 Claims, 10 Drawing Sheets

SYSTEMS, METHODS, AND DEVICES FOR IMPROVED SECURITY POLICY DISTRIBUTION IN A CLOUD-COMPUTING ENVIRONMENT

FIELD OF TECHNOLOGY

This patent document relates generally to computing platforms, and more specifically to distribution of security policies amongst components of cloud-based computing platforms.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks. Cloud computing services may be hosted by computing platforms and may be implemented using domains. As the number of entities using such cloud computing services increases, the number of domains may become numerous. Conventional techniques for managing security policies for such domains remain limited because they are not able to efficiently manage security policies for large numbers of domains.

BRIEF DESCRIPTION OF THE DRAWINGS

The included drawings are for illustrative purposes and serve only to provide examples of possible structures and operations for the disclosed inventive systems, apparatus, methods and computer program products for distribution of security policies in computing platforms. These drawings in no way limit any changes in form and detail that may be made by one skilled in the art without departing from the spirit and scope of the disclosed implementations.

DETAILED DESCRIPTION

Distributed applications may be hosted using various domains implemented in various different computing platforms. As the number of users associated with applications increases and instances of that application increase, management of security policies becomes cumbersome and untenable. For example, layer 7 web application firewall policies may require manual configuration to ensure that security operations are performed accurately for each domain. More specifically, a firewall policy may need to be manually configured for each domain to ensure that the security policy is accurately distinguishing between safe network traffic and potentially harmful network traffic. As communications may occur between thousands of domains, manual management of such policies remains inefficient and untenable.

Various implementations described herein provide the ability to distribute and implement policies across various domains and their associated computing platforms. More specifically, domains may be used to host distributed applications, and such domains may each include drivers that are configured to be communicatively coupled via a secure message bus. Moreover, generic policy objects may be published via such a secure message bus and propagated to the drivers. The drivers may then determine whether or not a generic policy object should be implemented in its respective domain, and may perform one or more operations prior to such implementation, such as performing one or more modifications as well as a translation to a specific policy object. In this way, each of the drivers may be configured to manage security policies for its respective domain, and the distribution of policies to various domains may be performed without the need for manual intervention.

Figure 1:
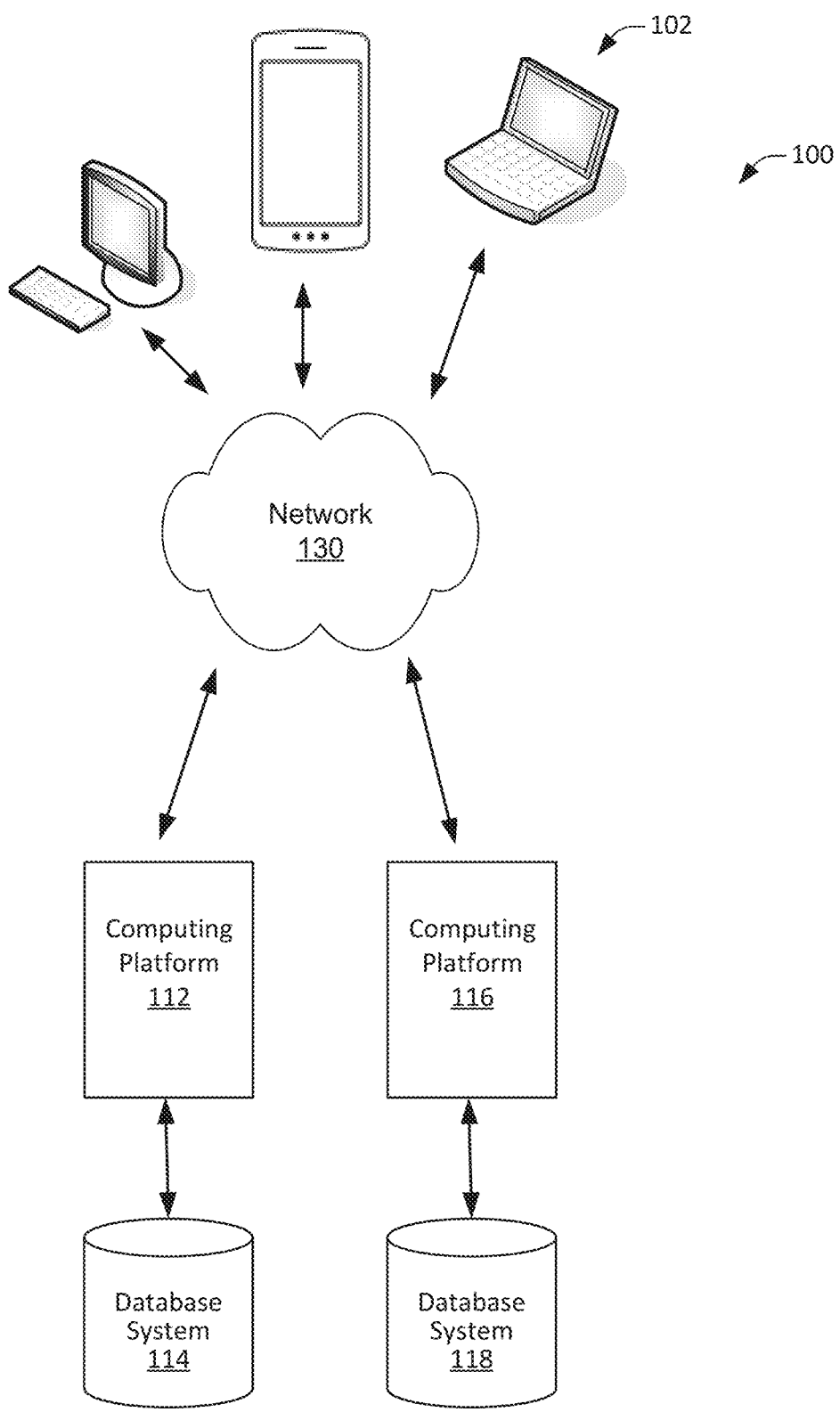
FIG. 1 illustrates an example of an arrangement of components in a computing platform system, configured in accordance with one or more implementations.

FIG. 1 illustrates an example of an arrangement of components in a computing platform system, configured in accordance with one or more implementations. As will be discussed in greater detail below, a system, such as system 100, may be implemented to distribute and customize security policies used by components of system 100 to enhance and improve management of security policies within system 100. More specifically, security policies may be published to a shared location in a generic format, and may be distributed to different domains which may each generate a specific security policy based on the published security policy.

System 100 includes one or more client machines, which may also be referred to herein as client devices, such as client machine 102. In various implementations, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various implementations, client machine 102 comprises one or more processors configured to execute one or more applications that may utilize a user interface. A user may request and view various different display screens associated with such applications via client machine 102. In various implementations, a user interface may be used to present the display screen to the user, as well as receive one or more inputs from the user. In some implementations, the user interface may utilize a web browser executed on client machine 102 or may be a standalone locally executed application. Moreover, such user interfaces may be used to access on-demand services and software applications, as will be discussed in greater detail below.

In various implementations, system 100 further includes one or more servers configured to provide a computing platform, such as computing platform 112, and various client devices may be communicatively coupled to computing platform 112. In various implementations, computing platform 112 is configured to include software and hardware that provides an environment for the execution of an application. As will be discussed in greater detail below, computing platform 112 may include components configured to implement a service layer and a data layer associated with one or more hosted applications.

More specifically, computing platform 112 may include one or more processors and memory configured execute components of a software application. As will be discussed in greater detail below, computing platform 112 may be configured to publish and distribute security policies to various different domains which may each include one or more components, such as a driver and scheduler, that are configured to generate specific versions of those security policies for their respective domains. In this way, security policy distribution and customization may be largely automated, thus enabling security policy management for numerous domains in scalable manner. In some implementations, computing platform 112 may also be configured to store program code and settings for a particular application, and may also be configured to execute the code.

Computing platform 112 may be in communication with numerous client devices and may implement the application in a distributed manner. In some implementations, computing platform 112 is further configured to generate and serve webpages that may be viewed by a user via one or more devices, such as client machine 102. Accordingly, computing platform 112 is configured to provide a web-based interface between a user of client machine 102 and an application that is deployed in a distributed environment. In some implementations, computing platform 112 is coupled to database system 114 which may be configured to store various application data and data associated with webpages served by computing platform 112, and thus may provide local storage for computing platform 112.

In some implementations, system 100 additionally includes computing platform 116 and its associated database system 118. Accordingly, system 100 may include multiple computing platforms that are in communication with each other, and in some implementations, security policies may be managed across different computing platforms.

Figure 2:
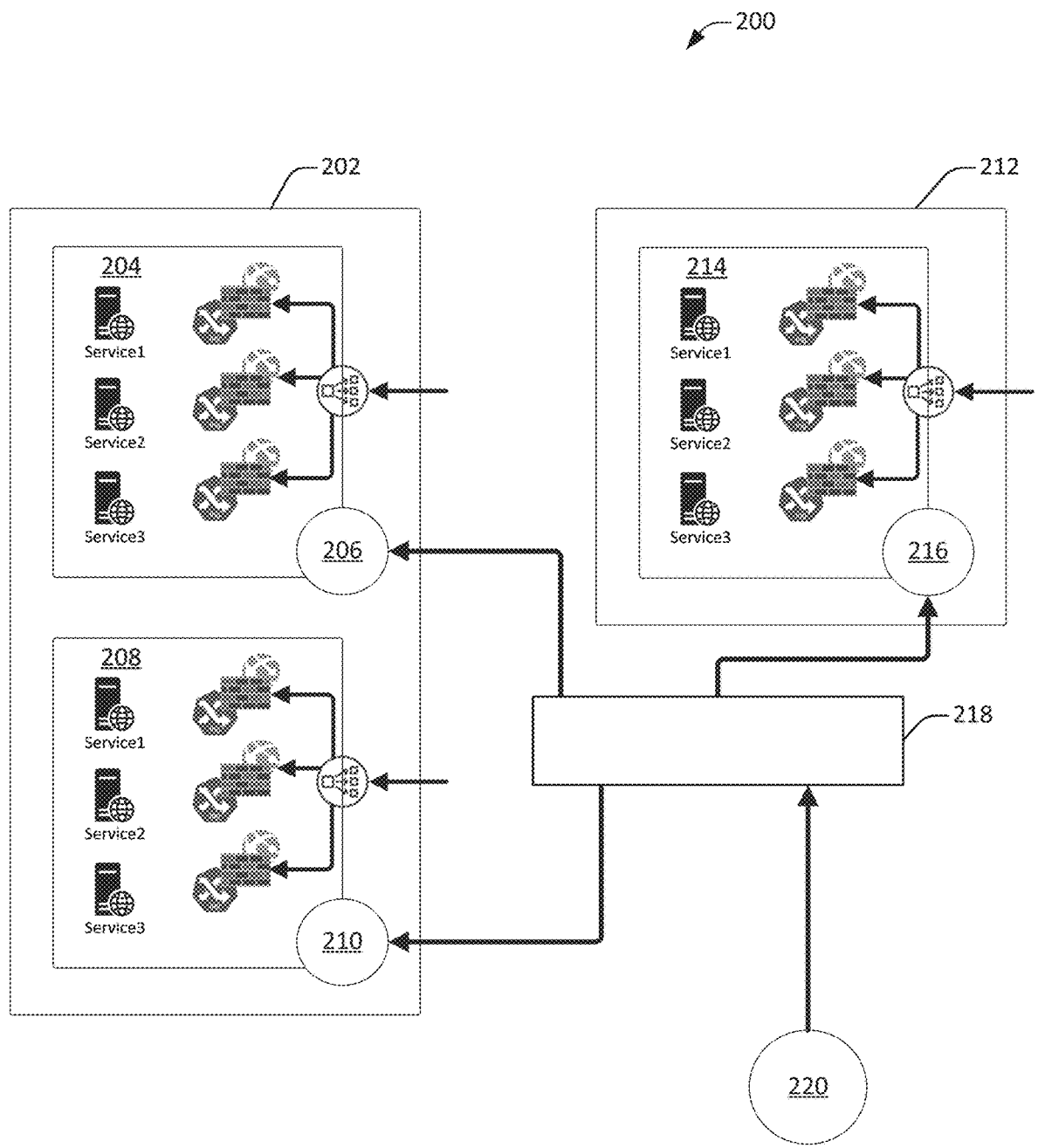
FIG. 2 illustrates an example of a computing platform system, configured in accordance with one or more implementations.

FIG. 2 illustrates an example of a computing platform system, configured in accordance with one or more implementations. As similarly discussed above, a system, such as system 200, may be implemented to distribute and customize security policies used by components of system 200 to enhance and improve management of security policies within system 200.

As will be discussed in greater detail below, different domains which may be hosted in different computing platforms may include components to access generic security policies and perform translation operations to generate specific security policies.

System 200 may include first computing platform 202 which may host an application implemented in domains, such as first domain 204 and second domain 208. For example, first computing platform 202 may be web services platform configured to provide on-demand services and hosting of applications. In some implementations, first computing platform 202 may host security applications that may be implemented in different domains, such as first domain 204 and second domain 208. Accordingly, first domain 204 may be configured to host traffic from a first set of domains, such as salesforce.com and login.slack.com, and second domain 208 may be configured to host traffic from a second set of domains, such as login.salesforce.com, tableu.com, and customer01salesforce.com.

Each domain may have a driver, such as driver 206 and driver 210. Each driver is configured to maintain domain information about its associated domain, as well as maintain policy information for its associated domain. More specifically, a driver may include one or more processors and memory configured to store information identifying which domains its associated domain expects traffic from, as well as further configured to store policy information about requests and messages that are permissible to and from its associated domain. It will be appreciated that drivers disclosed herein may be implemented using any suitable hardware and/or software disclosed herein. In some implementations, a driver may be implemented as part of a server. In this way, driver 206 may manage domain and policy information for first domain 204, and driver 210 may manage domain and policy information for second domain 208. As will be discussed in greater detail below, driver 206 and driver 210 may each be configured to translate generic security policy objects to domain-specific policy objects, and further configured to publish generic security policy objects. In this way, driver 206 and driver 210 may be configured to generate and implement domain-specific security policies based on one or more generic security policy objects.

System 200 may also include second computing platform 212 which may host an application implemented in a domain, such as third domain 214 which may include driver 216. As similarly discussed above, third domain 214 may be configured to host traffic from a third set of domains, such as customer02.salesforce.com. Moreover, driver 216 may be configured to manage domain and policy information for third domain 214. More specifically, as similarly discussed above, driver 216 may be configured to generate and implement domain-specific security policies based on one or more generic security policy objects.

System 200 may also include security bus 218 which is configured to provide secure messaging between drivers in different domains. Accordingly, security bus 218 is configured to provide secure communicative coupling between driver 206, driver 210, and driver 216. As shown in FIG. 2, security bus 218 may also be coupled to another entity, such as policy requestor 220 which may be configured to trigger generation of a policy by a driver, or may be configured to publish a generic security policy object. For example, policy requestor 220 may provide an input that indicates a security policy should be deployed globally (across all domains), and may include a generic security policy object. As will be discussed in greater detail below, driver 206, driver 210, and driver 216 may be configured to publish and receive generic security policy objects via security bus 218. It will be appreciated that security bus 218 may be any suitable communications bus, or may be a secure server that includes a dedicated storage location, such as a database system.

As will be discussed in greater detail below, drivers may be configured to manage the implementation of received generic security policy objects. For example, policy requestor 220 may request that a new policy be deployed globally. More specifically policy requestor 220 may want to deploy a new L7 policy for the domain customer01.salesforce.com. The new L7 policy may be deployed as a generic security policy object that is published to security bus 218 and deployed to driver 206, driver 210, and driver 216. Each of the drivers may maintain configuration data for domains it hosts, and may use such configuration data to determine a list of domains it has received traffic from in the past. Based on this configuration data, the driver may determine if it has seen traffic from customer01.salesforce.com, and also determine if modifications should be made to the policy or if it should be implemented as a new policy, as will be discussed in greater detail below. In this example, the domain customer01.salesforce.com may be a subdomain of salesforce.com and too specific for driver 206 and driver 216. Accordingly, in this example, driver 206 and driver 216 may ignore the policy based on one or more hostname rules, and driver 210 may process the request and implement the generic security policy object.

In another example, policy requestor 220 may want to deploy a new L7 policy for the domain salesforce.com. In this example, the identified host is not too specific for any of the drivers, so each of driver 206, driver 210, and driver 216 may use their respective list of hostnames to determine if they have seen traffic from salesforce.com. Accordingly, driver 206, driver 210, and driver 216 each determine that the host identified in the generic security policy object matches a hostname in a list of hostnames serviced by their respective domains. In this example, driver 210 and driver 216 have not seen traffic from salesforce.com and may ignore the generic security policy object, whereas driver 206 has seen traffic from salesforce.com, and may update the generic security policy object or merge it with an existing one.

In yet another example, policy requestor 220 may want to deploy a new L7 policy for the domain login.salesforce.com. As similarly discussed above, each of driver 206, driver 210, and driver 216 may determine if they have potentially handled traffic from login.salesforce.com. In this example, driver 206 and driver 210 may determine that the host identified in the generic security policy object is close enough to hostnames identified in their respective lists that they may. More specifically, driver 210 may determine that there is an exact match and proceed to process the generic security policy object. Driver 206 may identify a partial match based on the domain (not subdomain). Accordingly, driver 206 may examine log information to determine if it has previously handed traffic from login.salesforce.com. If it has previously seen traffic from login.salesforce.com, driver 206 may create a new generic security policy object so as not to interfere with a policy associated with the broader domain salesforce.com. In this example, driver 206 now manages traffic from salesforce.com, login.salesforce.com, and login.slack.com using a policy for each of them. Additional details regarding the operations of generating generic security policy objects and specific security policy objects are discussed in greater detail below.

Figure 3:
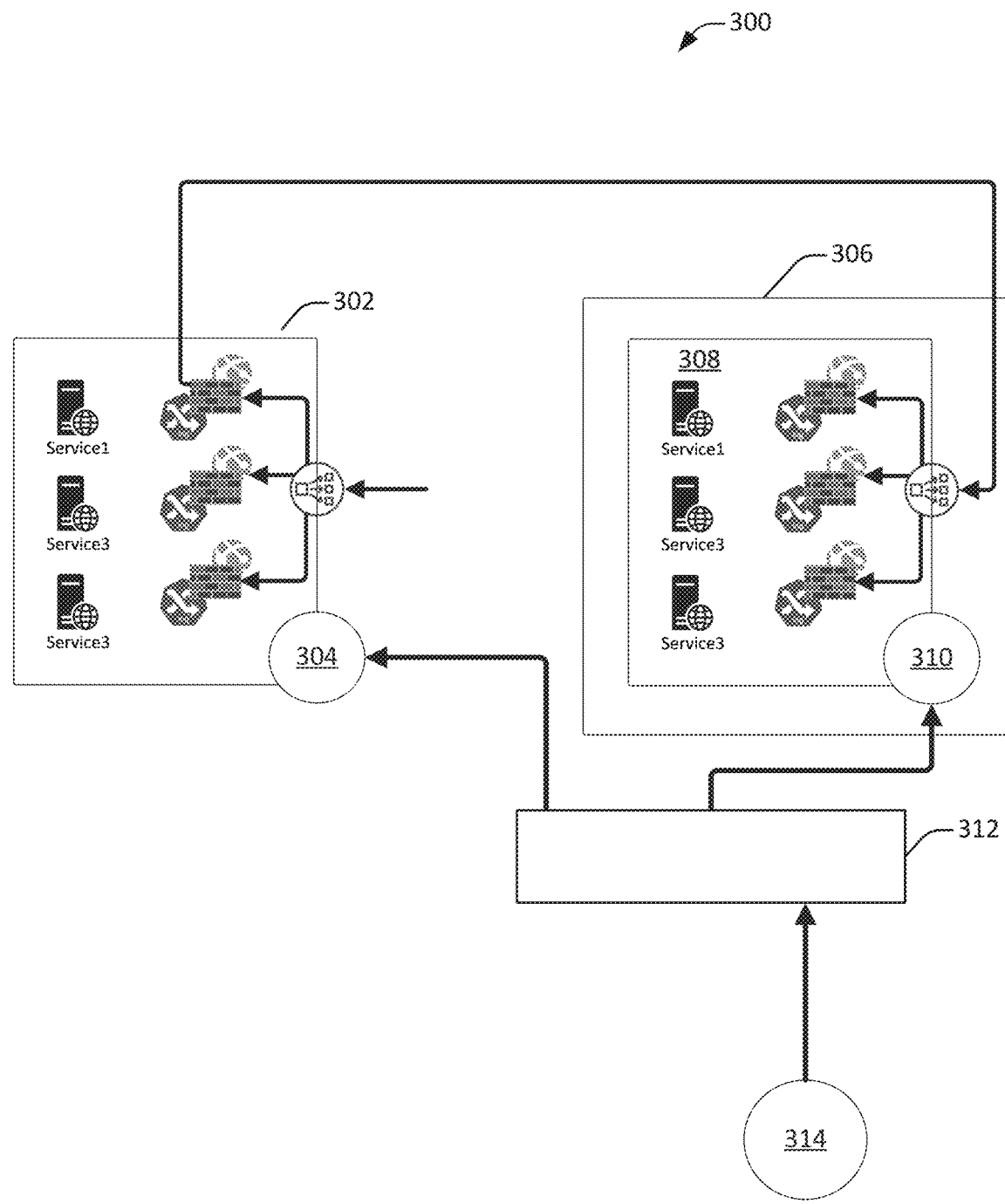
FIG. 3 illustrates an example of a method for security policy distribution, performed in accordance with one or more implementations.

FIG. 3 illustrates an example of a method for security policy distribution, performed in accordance with one or more implementations. As similarly discussed above, a system, such as system 300, may be implemented to distribute and customize security policies used by components of system 300 to enhance and improve management of security policies within system 300. As will be discussed in greater detail below, different domains which may be hosted in different computing platforms may include components to access generic security policies and perform translation operations to generate specific security policies.

System 300 may include domain 302 which may include driver 304. As similarly discussed above, a domain, such as domain 302, may be configured to host traffic from a first set of domains. In some implementations, domain 302 is configured to host traffic handled by a content data network. Accordingly, domain 302 may be used to provide security services for the content data network. As similarly discussed above, driver 304 may be configured to manage domain and policy information for domain 302. More specifically, driver 304 may be configured to configured to generate and implement domain-specific security policy objects based on one or more generic security policy objects.

System 300 may also include computing platform 306 which may host an application implemented in a domain, such as domain 308, which may be a Salesforce.com application hosted in a Salesforce.com domain. In various implementations, domain 308 includes driver 310 which is configured to manage domain and policy information for domain 308. More specifically, driver 310 may be configured to configured to generate and implement domain-specific security policy objects based on one or more generic security policy objects.

System 300 may also include security bus 312 which is configured to provide secure messaging between drivers in different domains. As similarly discussed above, security bus 312 is configured to provide secure communicative coupling between driver 304 and driver 310. As shown in FIG. 3, security bus 218 may also be coupled to another entity, such as policy requestor 314 which may be configured to trigger generation of a policy by a driver, or may be configured to publish a generic security policy object. For example, policy requestor 314 may provide an input that indicates a security policy should be deployed globally (across all domains), and may include a generic security policy object.

As will be discussed in greater detail below, driver 304 and driver 310 may be configured to publish and receive generic security policy objects via security bus 218. As will be discussed in greater detail below, a generic security policy object may be provided by policy requestor 314 to security bus 312, and transmitted to driver 304 and driver 310. In some implementations, driver 304 may generate an additional security policy object which is transmitted to driver 310 via security bus 312. Driver 310 may then merge the policies received from policy requestor 314 and driver 304, and generate a specific security policy object. It will be appreciated that security bus 312 may be any suitable communications bus, or may be a secure server that includes a dedicated storage location, such as a database system. Additional details regarding the operations of generating generic security policy objects and specific security policy objects are discussed in greater detail below.

Figure 4:
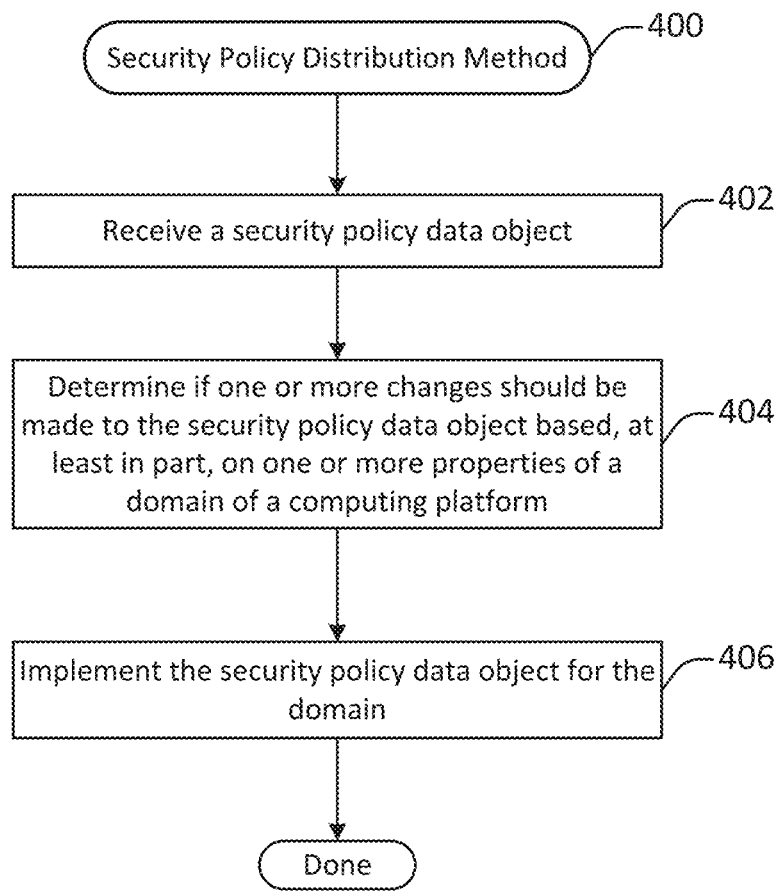
FIG. 4 illustrates an example of a method for security policy distribution, performed in accordance with one or more implementations.

FIG. 4 illustrates an example of a method for security policy distribution, performed in accordance with one or more implementations. As will be discussed in greater detail below, a method, such as method 400, may be implemented to distribute and customize security policies to enhance and improve management of security policies within a distributed computing system. More specifically, drivers may be implemented to automate and manage security policy management operations to automate implementations of security policies in domains.

Method 400 may perform operation 402 during which a security policy data object may be received. In one example, the security policy data object may be a generic security policy data object that has a generic syntax. Moreover, the security policy data object may be received from a security bus, and may be received at a driver associated with a domain.

Method 400 may perform operation 404 during which it may be determined if one or more changes should be made to the security policy data object based, at least in part, on one or more properties of a domain of a computing platform. As will be discussed in greater detail below, the security policy data object may be modified based on one or more properties of the security policy data object, such as a host identified within the security policy data object, whether or not the security policy data object is new, and whether or not there are network traffic parameters that indicate a change should be made. In this way, policies and network activity specific to the receiving driver and its associated domain may be used to customize the security policy data object via one or more changes.

Method 400 may perform operation 406 during which the security policy data object may be implemented for the domain. Accordingly, as will be discussed in greater detail below, the security policy data object may be translated to a domain-specific security policy data object, and may be implemented in the domain associated with the driver that initially received the security policy data object.

Figure 5:
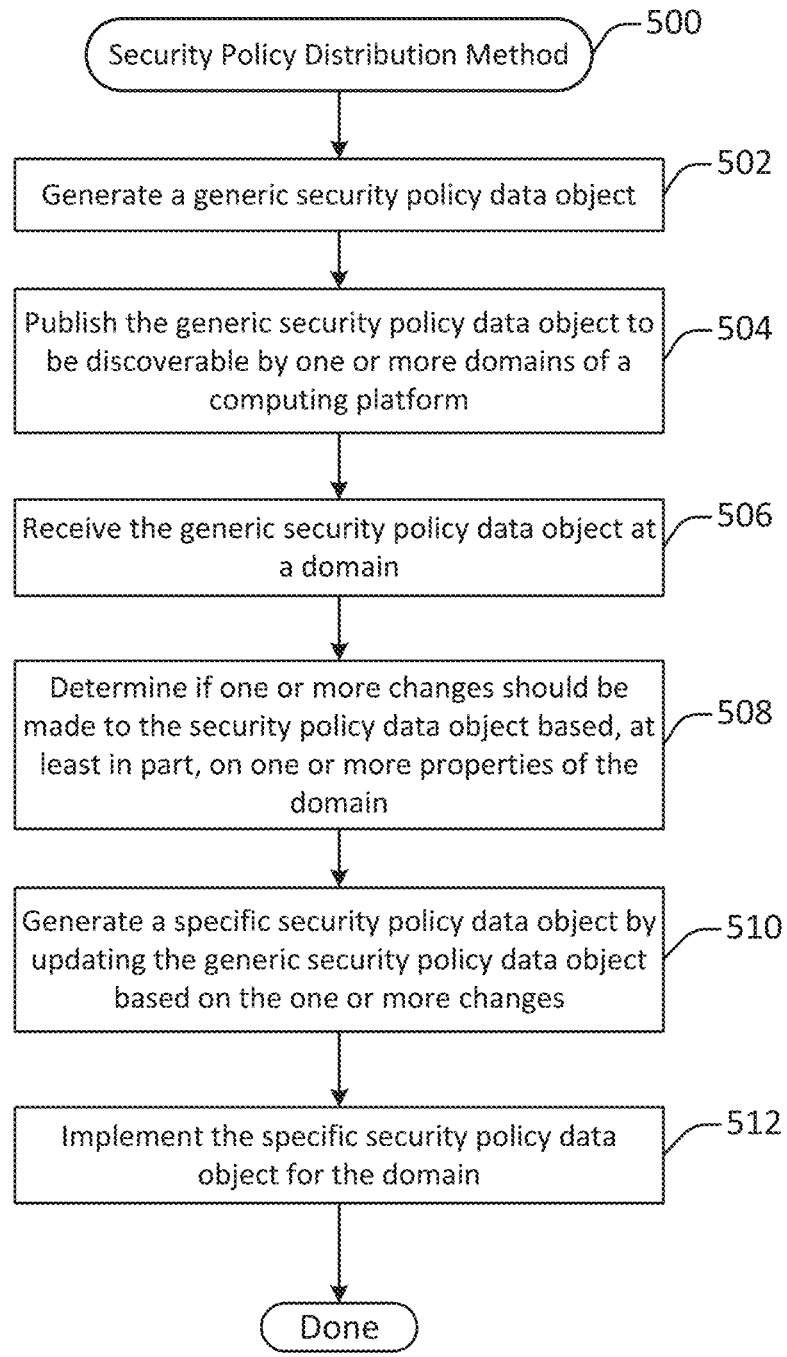
FIG. 5 illustrates an example of a method for security policy distribution, performed in accordance with one or more implementations.

FIG. 5 illustrates an example of a method for security policy distribution, performed in accordance with one or more implementations. As will be discussed in greater detail below, a method, such as method 500, may be implemented to distribute and customize security policies to enhance and improve management of security policies within a distributed computing system. More specifically, drivers may be implemented to automate and manage security policy management operations to automate implementations of security policies in domains.

Method 500 may perform operation 502 during which a generic security policy data object may be generated. As discussed above, the generic security policy data object may be a security policy data object that has a generic syntax and is not specific to a native format and/or language of a particular instance of an application hosted in a domain. In some implementations, a generic syntax may include a generic representation of a policy that may simply include fields, such as a name, hostname, and protections. For example, the In another example, a generic policy may include fields such as a name and status. Specific examples may be "name: RFC detector, status: enabled" and "name: Rate limiter engine, status: disabled". Accordingly, an example, of such a data object may be "{"name": "policy-for-falcon", "hostname": "n25.salesforce.com", "protections": [{"name": "RFC detector", "status": "enabled",}, {"name": "Rate limiter engine", "status": "disabled",},]}". The generic security policy data object may be generated by a driver implemented in a domain, or may be generated by another entity, such as a security policy manager or requestor that wants to deploy a policy globally and to all compute domains.

Method 500 may perform operation 504 during which the generic security policy data object may be published to be discoverable by one or more domains of a computing platform. As similarly discussed above, the generic security policy data object may be transmitted to a security bus, and the generic security policy data object may then be transmitted via the bus to one or more other entities, such as other domains. The domains may then determine which operations are appropriate to take. It will be appreciated that the security bus facilitates distribution of a generic security policy data object regardless of whether or not the originator of the security policy data object knows the location of target domains. For example, a policy requestor may not know the location of all compute domains for which a policy should be implemented. In this example, the policy requestor may provide the generic security policy data object to the security bus, and the security bus may transmit the generic security policy data object to the compute domains based on its known and stored network topology.

Method 500 may perform operation 506 during which a security policy data object may be received. As similarly discussed above, the generic security policy data object may be received at a driver included in each of one or more domains via the security bus, and the drivers may determine whether or not the security policy data object is relevant and intended for its associated domain.

Method 500 may perform operation 508 during which it may be determined if one or more changes should be made to the generic security policy data object based, at least in part, on one or more properties of the domain. As similarly discussed above, the generic security policy data object may be modified based on one or more properties of the generic security policy data object, such as a host identified within the security policy data object, whether or not the security policy data object is new, and whether or not there are network traffic parameters that indicate a change should be made.

More specifically, a host identified in the security policy data object may be compared against a list of hostnames to determine if the generic security policy data object should be used or not. Furthermore, a determination of whether or not the security policy data object is new may be used to determine what, if any, modifications should be made to the generic security policy data object. Additionally, observed network traffic may also be used to determine if the generic security policy data object should be modified. Additional details regarding specifics of these determinations and operations are discussed in greater detail with reference to FIG. 7.

Method 500 may perform operation 510 during which a specific security policy data object may be generated by updating the generic security policy data object based on the one or more changes. Accordingly, it may be determined if changes, such as a merge operations with another security policy data object should be performed. Moreover, one or more translation operations may also be performed. Accordingly, the security policy data object may be converted to a generic syntax to a specific syntax and stored as a domain-specific security policy data object. In some implementations, the specific syntax may be determined based on a specific entity. For example, a specific destination firewall or a particular vendor, such as Cisco®, will have a specific syntax that has been previously defined by that entity.

Method 500 may perform operation 512 during which the specific security policy data object may be implemented in the domain. Accordingly, as similarly discussed above, the domain-specific security policy data object may be implemented in the domain associated with the driver that initially received the security policy data object as a new security policy for that domain.

Figure 6:
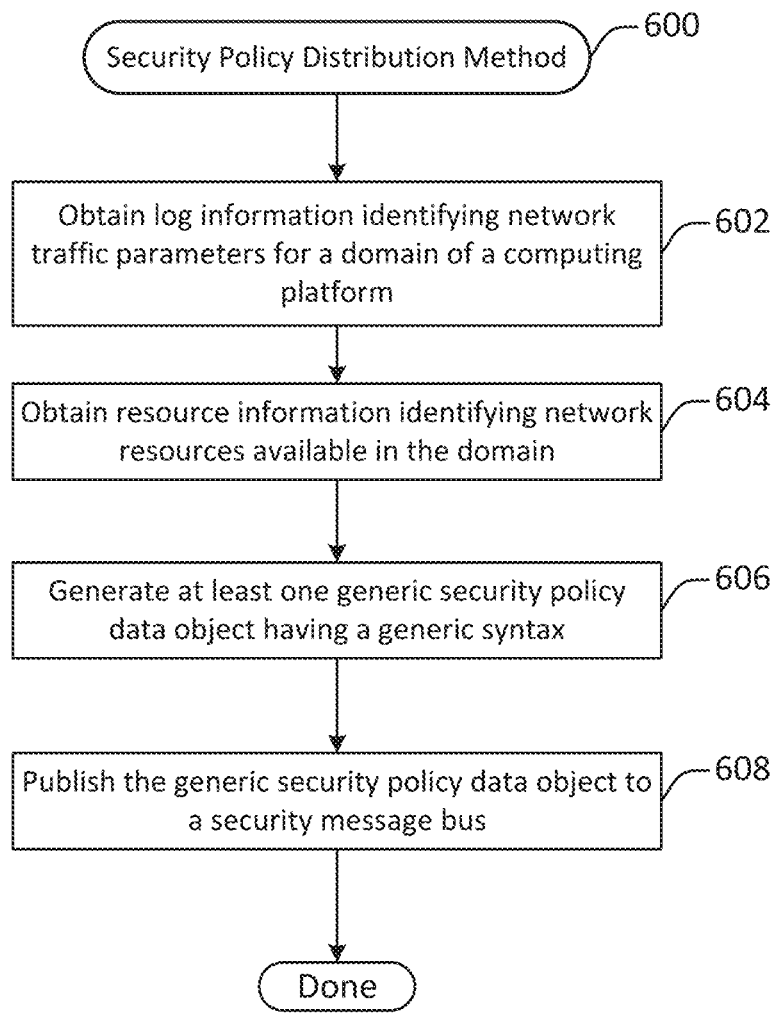
FIG. 6 illustrates an example of a method for security policy distribution, performed in accordance with one or more implementations.

FIG. 6 illustrates an example of a method for security policy distribution, performed in accordance with one or more implementations. As will be discussed in greater detail below, a method, such as method 600, may be performed to generate a generic security policy data object that may be distributed to multiple domains. More specifically, network information identifying network activity and traffic patterns as well as resource information identifying available resources may be used to generate a generic security policy data object.

Method 600 may perform operation 602 during which log information identifying network traffic parameters may be identified for a domain of a computing platform. In various implementations, a component of a domain, such as a scheduler, may be queried to retrieve log files. Such log files may identify one or more domains it has communicated with. Accordingly, the log information may be retrieved and may be used by an entity, such as a driver or policy requestor, to identify a host and/or generate a list of hostnames.

Method 600 may perform operation 604 during which resource information identifying available network resources may be identified for the domain. The information retrieved from the scheduler may also identify particular network resources, such as particular servers and other network components, as well as activity thresholds associated with such network components. For example, such activity thresholds may identify a maximum number of requests that may be provided to an entity, such as a driver, during a designated period of time.

Method 600 may perform operation 606 during which at least one generic security policy data object having a generic syntax may be generated. Accordingly, the generic security policy data object may be generated based, at least in part, on the log information and the resource information. In some implementations, a generic security policy data object may include, in a generic format, data fields such as a name of the policy, a hostname of the policy, a list of protections that can be enabled or disabled, and any other suitable general constructs that are defined as generic by an entity, such as a developer or administrator.

Method 600 may perform operation 608 during which the generic security policy data object may be published to a security bus. Accordingly, as discussed above, the generic security policy data object may be made accessible to other entities, such as drivers, which may determine if they should implement the generic security policy data object.

Figure 7:
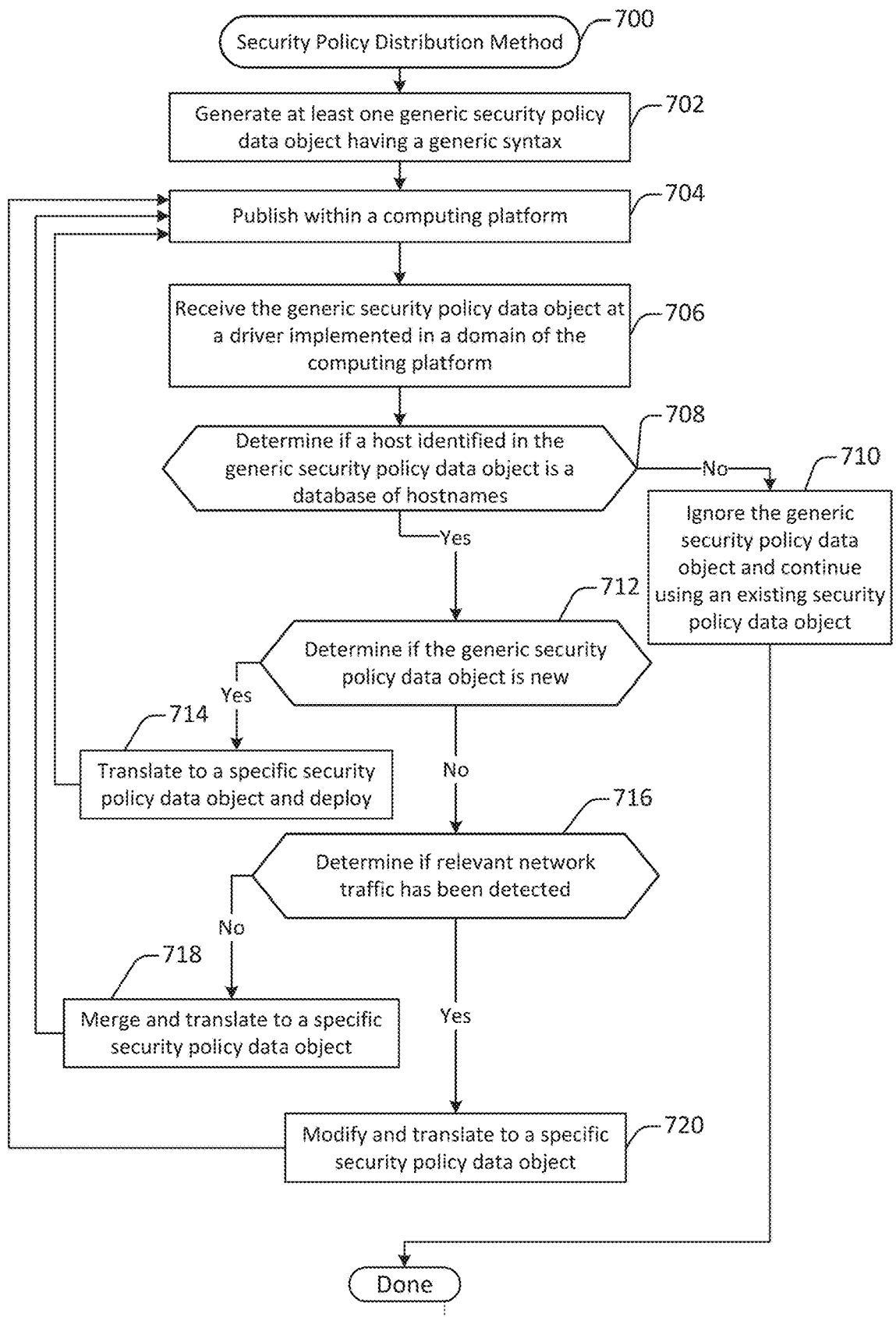
FIG. 7 illustrates an example of a method for security policy distribution, performed in accordance with one or more implementations.

FIG. 7 illustrates an example of a method for security policy distribution, performed in accordance with one or more implementations. As will be discussed in greater detail below, a method, such as method 700, may be implemented to distribute and customize security policies to enhance and improve management of security policies within a distributed computing system. More specifically, drivers may be implemented to automate and manage security policy management operations to automate implementations of security policies in domains.

Method 700 may perform operation 702 during which a generic security policy data object having a generic syntax may be generated. As discussed above, the generic security policy data object may be generated using a generic syntax and is not specific to a native format and/or language of a particular instance of an application hosted in a domain. The generic security policy data object may be generated by a driver implemented in a domain, or may be generated by another entity, such as a security policy manager or requestor that wants to deploy a policy globally and to all compute domains.

Method 700 may perform operation 704 during which the generic security policy data object may be published within a computing platform. As similarly discussed above, the generic security policy data object may be transmitted to a security bus, and the generic security policy data object may then be transmitted via the bus to one or more other entities, such as drivers implemented in other domains.

Method 700 may perform operation 706 during which the generic security policy data object may be received at a driver implemented in a domain of the computing platform. As similarly discussed above, the generic security policy data object may be received at a driver included in each of one or more domains via the security bus. As will be discussed in greater detail below, the drivers may determine whether or not the security policy data object is relevant and intended for its associated domain.

Method 700 may perform operation 708 during which it may be determined if a host identified in the generic security policy data object is a database of hostnames. Such a determination may be made based on a comparison of a host identified in the generic security policy data object and a plurality of hostnames identified in a database of hostnames. As similarly discussed above, the database may include a list of hostnames, and the host identified in the generic security policy data object may be compared against that list to determine if the identified host matches any of the host names. As also discussed above, the determination of a match may be made based on one or more aspects of a domain hierarchy or topology. For example, partial matches may be identified based on domains and subdomains. More specifically, if a driver manages a domain, observation of traffic from a subdomain may be identified as a partial match that is further processed.

In one example, a new generic security policy data object may be published that is labeled policyA, and may be defined as "policyA="name": "name1", "hostname": "na78.salesforce.com", "protections": [ . . . ]}". In this example, instances of drivers that process traffic through "na78.salesforce.com" will process the policy because it applies to them. A policy defined as "policyB={"name": "name2", "hostname": "*.salesforce.com", "protections": [ . . . ]}" may also be published to the bus. In this example, all instances of drivers that process traffic to "salesforce.com" independently of their subdomain would process this policy.

If it is determined that the host is not in a database of hostnames, method 700 may proceed to operation 710 during which the generic security policy data object may be ignored, the driver may continue using an existing security policy data object, and method 700 may terminate. In this way, if a driver receives a generic security policy data object that is not intended for that driver, the driver may ignore and discard the generic security policy data object based on the results of the hostname analysis.

Returning to operation 708, if it is determined that the host is in the database of hostnames, method 700 may proceed to operation 712 during which it may be determined whether or not the generic security policy data object is new. Such a determination may be made based on comparison of the generic security policy data object with one or more policies stored in a storage location of the driver. Such a storage location may be a policy database. In some implementations, such a comparison may be performed based on an identifier or a portion of a header included in the received generic security policy data object. If it is determined that the generic security policy data object is new, method 700 may proceed to operation 714 during which the generic security policy data object may be translated to a specific security policy data object and deployed within the domain.

Returning to operation 712, if it is determined that the generic security policy data object is not new, method 700 may proceed to operation 716 during which it may be determined whether or not relevant network traffic has been detected. Such a determination may be made based on information received from an entity, such as a scheduler, implemented within a domain. Accordingly, the scheduler may store and maintain log information representing network traffic to and from a domain. In this example, the log information may be retrieved and used to identify any new entities, such as new hostnames and domain names, that have been communicated with. As discussed above, the log information may be used to verify whether or not traffic from a subdomain is new and additional network traffic, or is simply part of communication with a domain that is already known.

The log information may also be used to identify differences in frequencies of access to domains. Thresholds associated with such determinations may be modified and configured by an entity, such as an administrator. Accordingly, a designated threshold value may be used to identify how many and which types of new hostnames and domain names should be considered relevant. A designated threshold value may also be used to identify frequencies of access, or other traffic metric, permissible for one or more hosts and/or domains.

If it is determined that relevant network traffic has not been detected, method 700 may perform operation 718 during which a merge operation may be performed and the resulting generic security policy data object may be translated to a specific security policy data object which may be deployed. In some implementations, the merge operation may include merging a generic security policy data object associated with a subdomain with that of a domain. In one example, two generic security policy data objects associated with two drivers; one that handles traffic for "na78.salesforce.com", and another driver that handles traffic for "video.salesforce.com". The first generic security policy data object may be labeled as policyA defined by "policyA={"name": "name1", "hostname": "na78.salesforce.com", "protections": [{"name": "rate limiter engine", "status": "enabled", "max_requests_per_second": 16}]}". The second generic security policy data object may be labeled as policyB defined by "policyB={"name": "name2", "hostname": "*.salesforce.com", "protections": [{"name": "rate limiter engine", "status": "enabled", "max_requests_per_second": 10}]}".

In this example, when policyA is published on the bus, the first driver processes the policy and enables the protection called "rate limiter engine" with the defined parameters, such as 16 requests per second. The second driver ignores policyA because the hostname doesn't apply to the second driver. However, when policyB is published on the bus, the first driver processes the policy because the hostname "*.salesforce.com" applies to "na78.salesforce.com" in accordance with the use of the operator "*". Accordingly, the first driver may merge/update the policies, and as a result of the merging, reduce the max_requests_per_second to 10. In this example, the second driver creates a new policy that will also max_requests_per_second set to 10. Method 700 may then return to operation 704 to publish the generic version of the security policy data object.

If it is determined that relevant network traffic has been detected, method 700 may perform operation 720 during which one or more modifications may be made to the generic security policy data object, and the resulting updated generic security policy data object may be translated to a specific security policy data object which may be deployed. In one example, a policy, such as policyC, is defined by "policyC={"name": "name2", "hostname": "video.salesforce.com", "protections": [{"name": "signatures", "status": "enabled"}]}". When policyC is published, changes might only be relevant to and apply to a particular driver. Accordingly, that driver may process the policy and instantiate a policy such as "policy_on_driver2={"name": "name2", "hostname": "video.salesforce.com", "protections": [{"name": "rate limiter engine", "status": "enabled", "max_requests_per_second": 10}, {"name": "signatures", "status": "enabled"}]}". Method 700 may then return to operation 704 to publish the generic version of the security policy data object.

Figure 8:
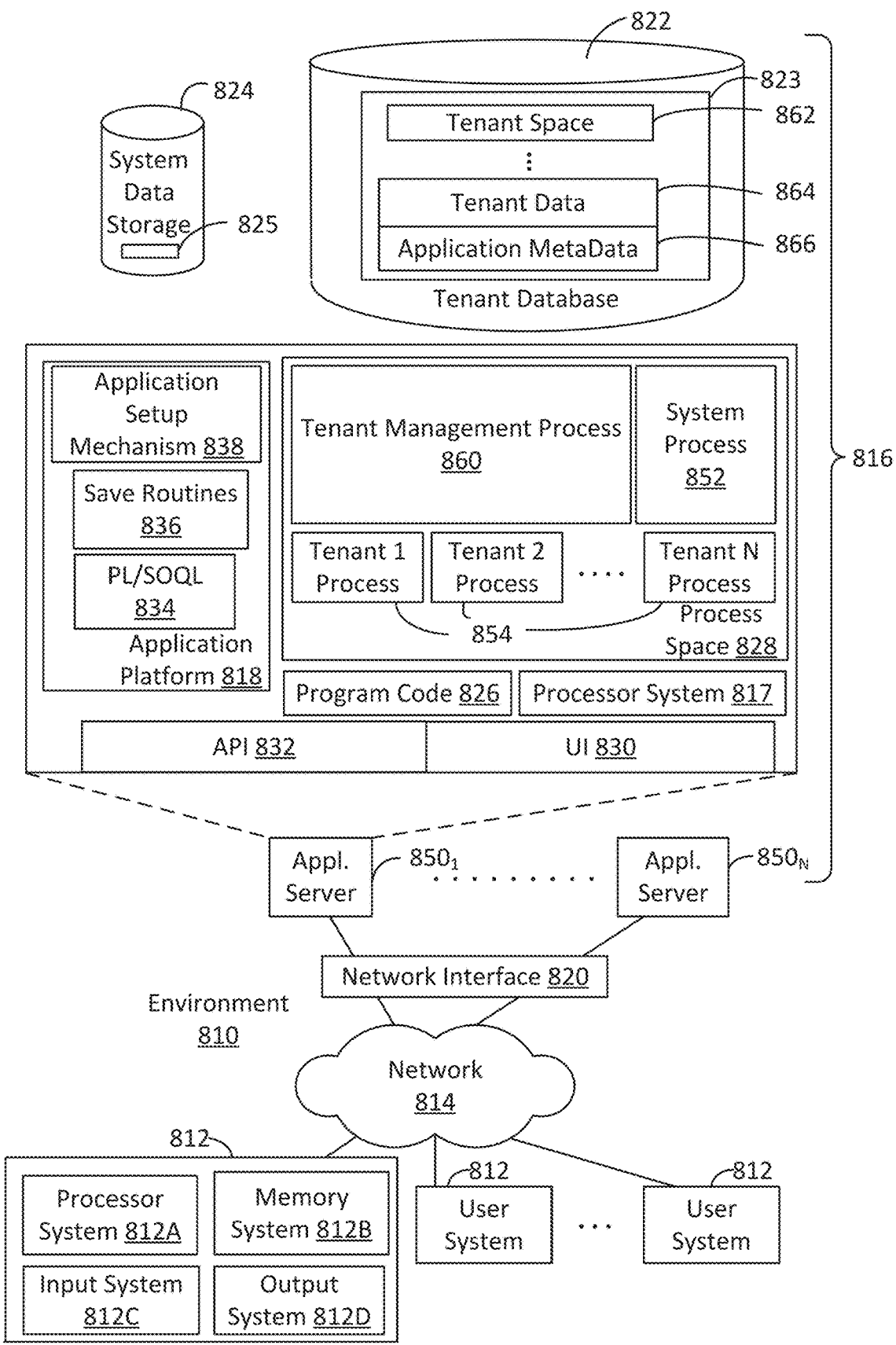
FIG. 8 shows a block diagram of an example of an environment that includes an on-demand database service configured in accordance with some implementations.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 818 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based policy distribution system. For example, in some implementations, system 816 may include application servers configured to implement and execute distributed software applications and associated security policies. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a security service system, a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data, performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
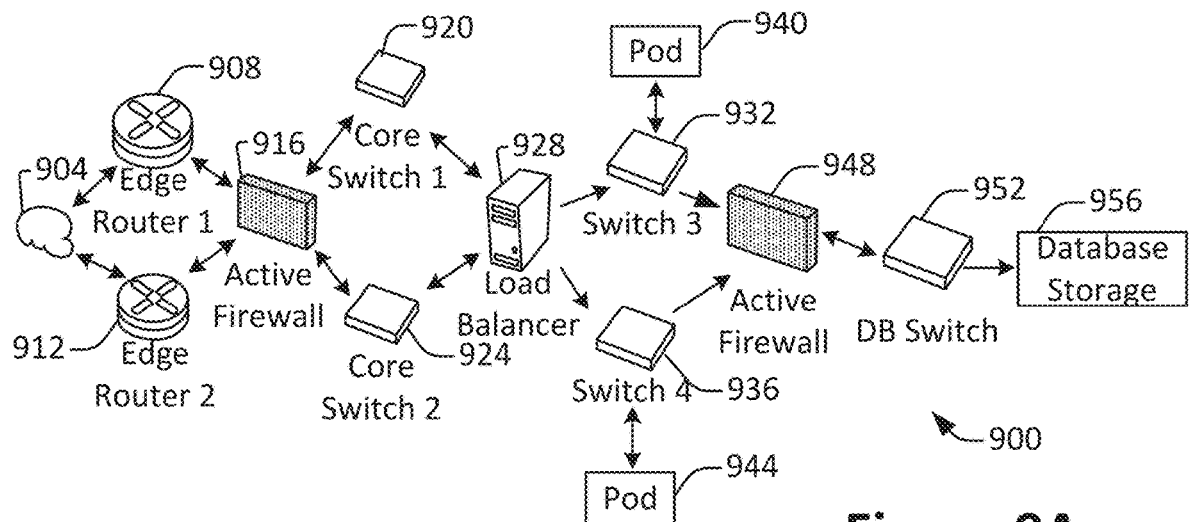
FIG. 9A shows a system diagram of an example of architectural components of an on-demand database service environment, configured in accordance with some implementations.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems 812 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process policy information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
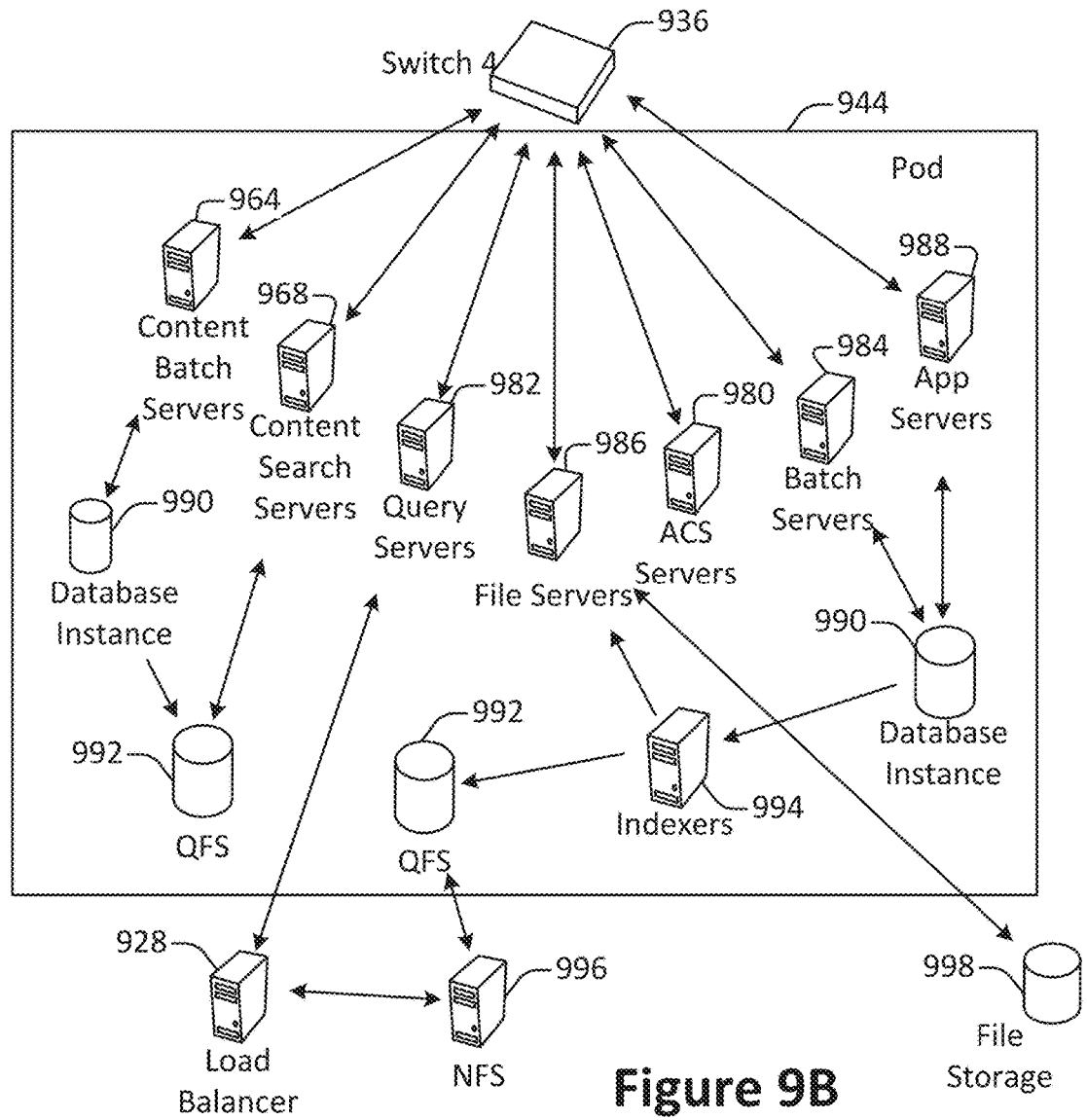
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968, query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBs), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
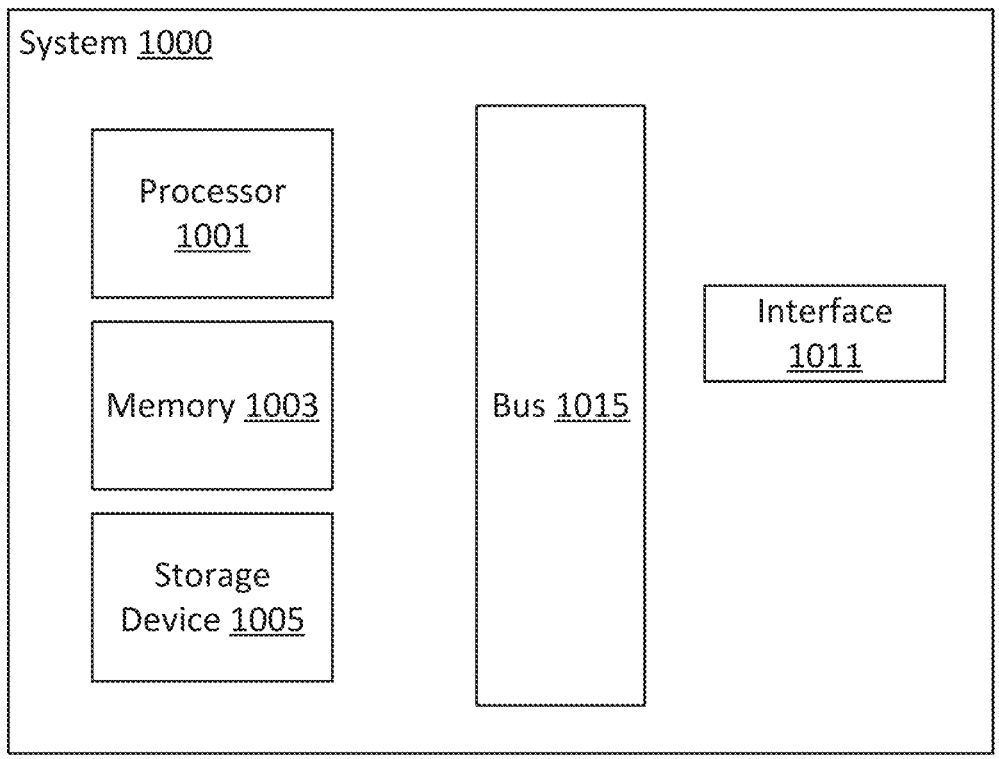
FIG. 10 illustrates one example of a computing device.

FIG. 10 illustrates one example of a computing device. According to various implementations, a system 1000 suitable for implementing implementations described herein includes a processor 1001, a memory module 1003, a storage device 1005, an interface 1011, and a bus 1015 (e.g., a PCI bus or other interconnection fabric.) System 1000 may operate as variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some implementations include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific implementations including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular implementations may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A computing platform implemented using a server system, the server system comprising one or more processors configured to perform:
   receiving a policy data object at a first domain of a plurality of domains of the computing platform, the policy data object identifying one or more security policies associated with the first domain;
   determining if the policy data object should be implemented at the first domain based, at least in part, on a second domain identified by the policy data object and a relationship between hostnames of the first domain and the second domain;
   determining if one or more changes should be made to the policy data object based, at least in part, on one or more properties of the first domain; and
   implementing the policy data object at the first domain by translating the policy data object from a generic syntax that is generic to the plurality of domains to a domain-specific syntax specific to the first domain.

2. The computing platform of claim 1, wherein determining if the policy data object should be implemented further comprises:
   comparing the second domain against a plurality of hostnames; and
   identifying a match between the second domain and at least one of the plurality of hostnames.

3. The computing platform of claim 2, wherein the plurality of hostnames is stored as a list of hostnames, and wherein the plurality of hostnames is generated based on observed network traffic to and from the first domain.

4. The computing platform of claim 2, wherein the determining if one or more changes should be made further comprises:
   determining if the policy data object is new to the first domain.

5. The computing platform of claim 4, wherein the determining if one or more changes should be made further comprises:
   determining if additional network traffic associated with the plurality of hostnames has been detected in the first domain.

6. The computing platform of claim 1, wherein the policy data object is received via a secure message bus.

7. The computing platform of claim 1, wherein the policy data object is received at a driver implemented in the first domain.

8. The computing platform of claim 1, wherein the policy data object is generated based on log information associated with the second domain.

9. The computing platform of claim 8, wherein the policy data object is generated based on network resource information associated with the second domain.

10. A method comprising:
    receiving a policy data object at a first domain of a plurality of domains of a computing platform, the policy data object identifying one or more security policies associated with the first domain;

determining if the policy data object should be implemented at the first domain based, at least in part, on a second domain identified by the policy data object and a relationship between hostnames of the first domain and the second domain;

determining if one or more changes should be made to the policy data object based, at least in part, on one or more properties of the first domain; and implementing the policy data object at the first domain by translating the policy data object from a generic syntax that is generic to the plurality of domains to a domain-specific syntax specific to the first domain.

11. The method of claim 10, wherein determining if the policy data object should be implemented further comprises:

comparing the second domain against a plurality of hostnames; and identifying a match between the second domain and at least one of the plurality of hostnames.

12. The method of claim 11, wherein the plurality of hostnames is stored as a list of hostnames, and wherein the plurality of hostnames is generated based on observed network traffic to and from the first domain.

13. The method of claim 11, wherein the determining if one or more changes should be made further comprises:

determining if the policy data object is new to the first domain.

14. The method of claim 13, wherein the determining if one or more changes should be made further comprises:

determining if additional network traffic associated with the plurality of hostnames has been detected in the first domain.

15. The method of claim 10, wherein the policy data object is received via a secure messaging bus.

16. The method of claim 10, wherein the policy data object is received at a driver implemented in the first domain.

17. The method of claim 10, wherein the policy data object is generated based on log information associated with the second domain.

18. A computer program product comprising a non-transitory computer-readable medium, the non-transitory computer-readable medium comprising non-transitory computer-readable program code, the non-transitory computer-readable program code comprising instructions which when executed by one or more processors cause the one or more processors to perform operations comprising:

receiving a policy data object at a first domain of a plurality of domains of a computing platform, the policy data object identifying one or more security policies associated with the first domain;

determining if the policy data object should be implemented at the first domain based, at least in part, on a second domain identified by the policy data object and a relationship between hostnames of the first domain and the second domain;

determining if one or more changes should be made to the policy data object based, at least in part, on one or more properties of the first domain; and implementing the policy data object at the first domain by translating the policy data object from a generic syntax that is generic to the plurality of domains to a domain-specific syntax specific to the first domain.

19. The computer program product recited in claim 18, wherein determining if the policy data object should be implemented further comprises:

comparing the second domain against a plurality of hostnames; and identifying a match between the second domain and at least one of the plurality of hostnames, wherein the plurality of hostnames is stored as a list of hostnames, and wherein the plurality of hostnames is generated based on observed network traffic to and from the first domain.

20. The computer program product recited in claim 19, wherein the determining if one or more changes should be made further comprises:

determining if the policy data object is new to the first domain; and determining if additional network traffic associated with the plurality of hostnames has been detected in the first domain.

* * * * *